(12) United States Patent
Arakawa et al.

(10) Patent No.: US 7,484,433 B2
(45) Date of Patent: Feb. 3, 2009

(54) SHIFT LEVER APPARATUS

(75) Inventors: Tetuya Arakawa, Shizuoka (JP);
Ryoichi Fujiwara, Shizuoka (JP);
Susumu Sakaba, Chiba (JP); Masanao Abe, Aichi (JP)

(73) Assignees: Fuji Kiko, Co., Ltd., Kosai-shi (JP);
Mitsubishi Jidosha Kyogo Kabushiki Kaisha, Tokyo (JP)

( * ) Notice: Subject to any disclaimer, the term of this patent is extended or adjusted under 35 U.S.C. 154(b) by 725 days.

(21) Appl. No.: 11/017,193

(22) Filed: Dec. 21, 2004

(65) Prior Publication Data
US 2005/0172883 A1      Aug. 11, 2005

(30) Foreign Application Priority Data
Dec. 25, 2003   (JP)   ............................. 2003-428848

(51) Int. Cl.
*G05G 1/00*   (2006.01)
(52) U.S. Cl. ........................................................ 74/566
(58) Field of Classification Search ................ 74/473.1, 74/473.13, 473.14, 473.15, 473.3, 473.34, 74/523, 524, 525, 528, 566; 116/28.1, 29
See application file for complete search history.

(56) References Cited

U.S. PATENT DOCUMENTS 4,503,730 A * 3/1985 Irvin ............................ 74/566
4,798,160 A * 1/1989 Mochida et al. ............. 116/28.1
6,082,286 A * 7/2000 Kovach et al. .............. 116/28.1

FOREIGN PATENT DOCUMENTS

JP              6-80051 U    11/1994

* cited by examiner

*Primary Examiner*—Vicky A Johnson
(74) *Attorney, Agent, or Firm*—Foley & Lardner LLP

(57) ABSTRACT

A shift lever apparatus for changing the change-speed ranges of a transmission of an automotive vehicle. The shift lever apparatus includes an indicator panel indicating positions which respectively correspond to the change-speed ranges. A slide member is provided to be movable in relation to a shift lever. A guide device is disposed to slidably guide the slide member and includes a descending guide section which allows the slide member to be guided to separate downward from the indicator panel. A mark piece is provided to indicate one of the positions of the indicator panel to represent the present change-speed range of the transmission. Additionally, a support member is fixedly connected to at least the major part of the slide member. The support member is free from following deformation of the slide member. The mark piece is fixedly connected to the support member.

17 Claims, 8 Drawing Sheets

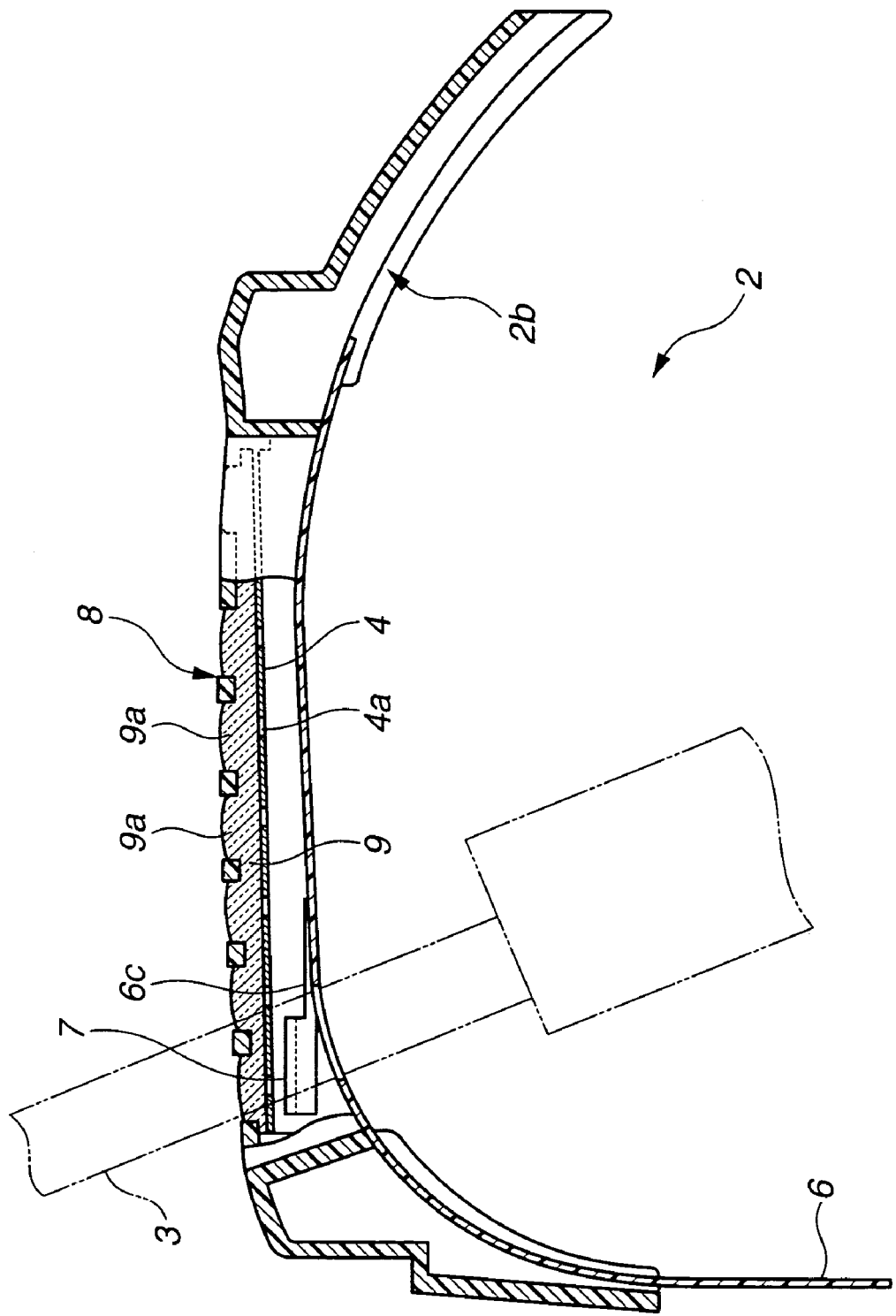

SHIFT LEVER APPARATUS

BACKGROUND OF THE INVENTION

This invention relates to improvements in a shift lever apparatus for operating a transmission of an automotive vehicle so as to change the change-speed ranges for the vehicle.

A shift lever apparatus is provided at the floor of an automotive vehicle to change the change-speed ranges of a transmission connected to an engine. A conventional shift lever apparatus as disclosed in Japanese Utility Model Provisional Publication No. 6-80051 is arranged as follows: The shift lever apparatus includes a shift lever which is disposed swingable in the fore-and-aft direction of a vehicle body on the floor of the vehicle. The shift lever is connected to the transmission and adapted to change the change-speed ranges of the transmission by changing the swinging angle thereof. The shift lever apparatus further includes a housing constituted of upper and lower housings. The upper housing is formed with a long opening which extends in the fore-and-aft direction of the vehicle body. The shift lever passes through the long opening so as to move in the longitudinal direction of the long opening.

An indicator or letter panel indicating letters "L", "2", "3", "D", "N", "R", and "P" as the change-speed ranges are disposed aside the long opening. A slide cover is provided to be movable in relation to the shift lever and to cover the long opening. Additionally, a guide device is formed between the upper and lower housings to allow the slide cover to be slidably guided in the fore-and-aft direction of the vehicle body. The slide cover is formed with a hole through which the shift lever passes so as to be movable in the fore-and-aft direction of the vehicle body together with the shift lever. The slide cover is provided with a mark piece on which a red seal is stuck. The mark piece can be visually recognized through one of indicator windows which are respectively located aside the above letters of the indicator panel, so that a driver can recognize the present change-speed range of the transmission.

The slide cover is slidable in the fore-and-aft direction of the vehicle body while covering or closing the above long opening of the upper housing. Therefore, the slide cover must cover the whole length of the long hole even when the shift lever is brought into the position of the P range located the fore-most and even when the shift lever is brought into the position of the L range located the rear-most. Consequently, the length of the slide cover is necessarily larger than the fore-and-aft direction length of the shift lever apparatus.

In such a shift lever apparatus, assuming that the whole body of the slide cover is horizontally guided, the fore-and-aft directional length of the shift lever apparatus is unavoidably increased. Accordingly, in case that a space is required to be formed rear of the shift lever apparatus, it is necessary to form a descending guide section for guiding the slide cover downward along a small radius of curvature, in the above-mentioned guide device.

However, the mark piece is formed integral with the slide cover. Therefore, if the descending guide section for the space-saving purpose is formed in the guide device, the mark piece follows the deformation of the slide cover in the descending guide section. As a result, the mark piece unavoidably moves downward separating from the indicator panel which is horizontally disposed, thereby being degraded in visibility.

SUMMARY OF THE INVENTION

It is, therefore, an object of the present invention to provide an improved shift lever apparatus for a vehicle, which can effectively overcome drawbacks encountered in conventional shift lever apparatuses for a vehicle.

Another object of the present invention is to provide an improved shift lever apparatus for a vehicle, in which visibility of a mark piece can be effectively prevented from being degraded even upon deformation of a support member for the mark piece, the mark piece being adapted to indicate one of positions of an indicator panel to represent the present change-speed range of a transmission.

A further object of the present invention is to provide an improved shift lever apparatus for a vehicle, in which the mark piece cannot follow deformation of a slide member even through the slide member is downwardly guided by a descending guide section of the support device for the slide member.

According to the present invention, a shift lever apparatus for a vehicle, comprises a shift lever which is swingable in a fore-and-aft direction of a vehicle body of the vehicle to change change-speed ranges of a transmission of the vehicle. An indicator panel is provided to indicate positions which respectively correspond to the change-speed ranges. The positions are aligned in the fore-and-aft direction of the vehicle body. A slide member is provided movable in relation to the shift lever. A guide device is disposed extending in the fore-and-aft direction of the vehicle body to slidably guide the slide member. The guide device includes a descending guide section which allows the slide member to be guided to separate downward from the indicator panel. The descending guide section is located one of first and second sides of the guide device. The first and second sides are opposite in the fore-and-aft direction of the vehicle body. A mark piece is provided to be adapted to indicate one of the positions of the indicator panel to represent a present change-speed range of the transmission. Additionally, a support member is fixedly connected to at least a major part of the slide member. The support member is free from following a deformation of the slide member. The mark piece is fixedly connected to the support member, so that the mark piece moves keeping close to the indicator panel along with sliding movement of the slide member.

BRIEF DESCRIPTION OF THE DRAWINGS

In the drawings, like reference numerals denote like parts and elements throughout all figures:

FIG. 8 is a vertical section view taken along a vertical plane (not shown) passing through the longitudinal axis of a long opening of the upper housing in the shift lever apparatus of FIG. 1, illustrating the operational manner of the mark piece in the shift lever apparatus according to the present invention.

DETAILED DESCRIPTION OF THE INVENTION

Figure 1:
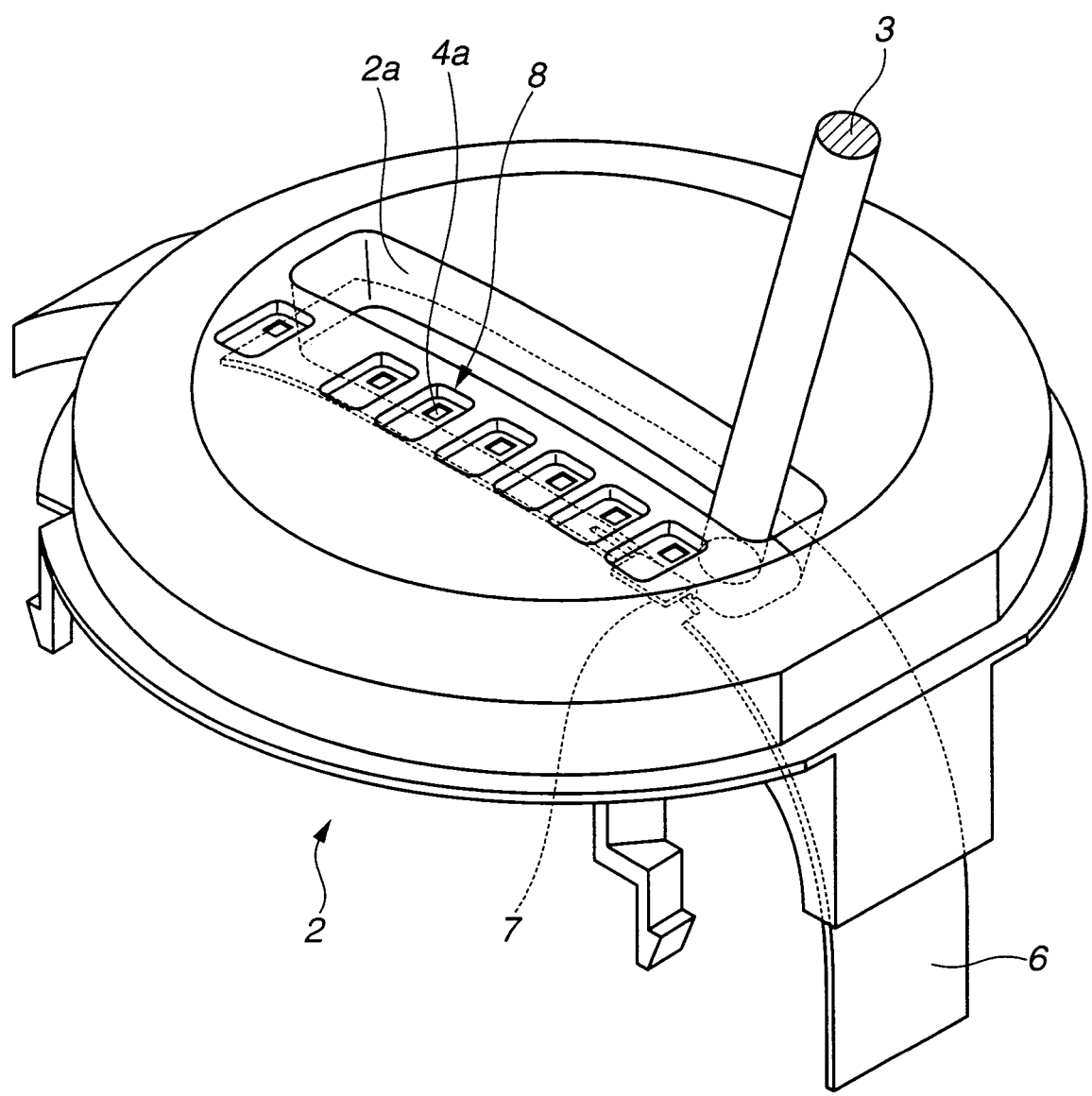
FIG. 1 is a perspective view of an embodiment of a shift lever apparatus according to the present invention.
Figure 2:
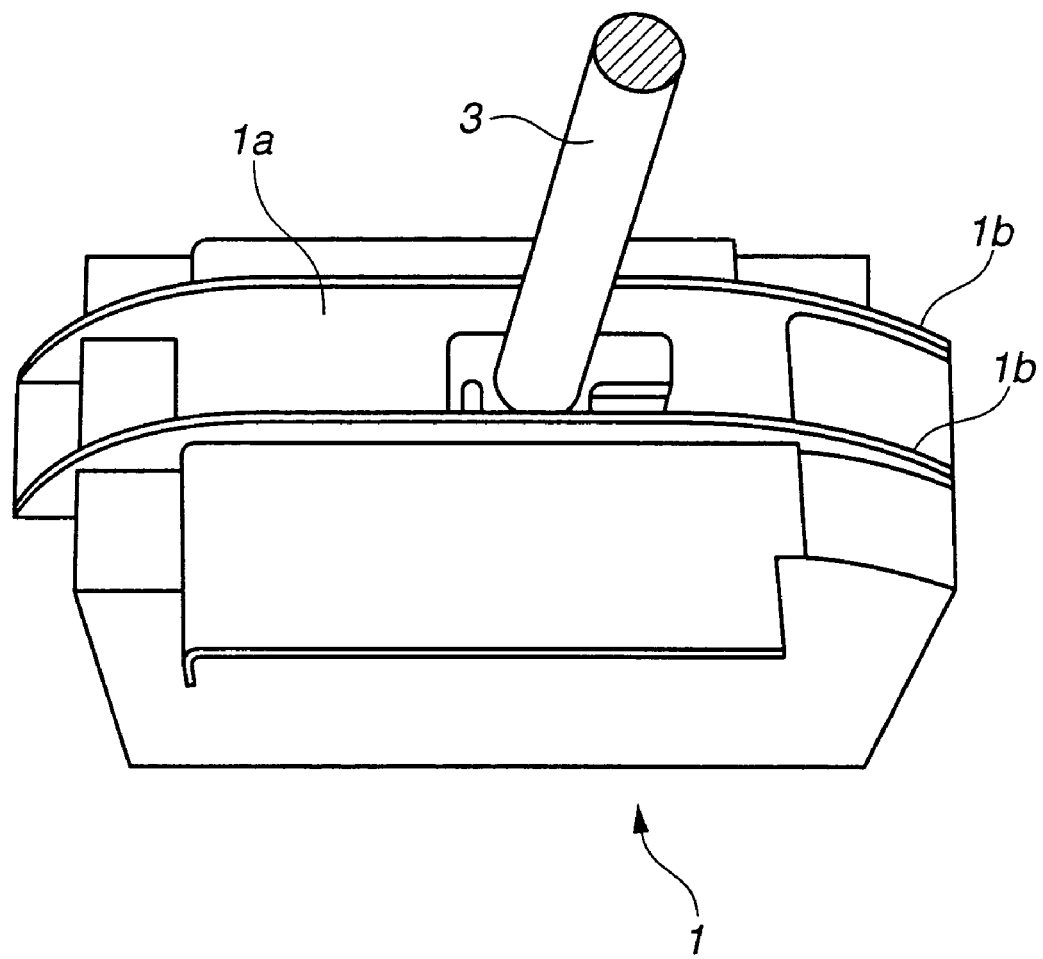
FIG. 2 is a perspective view of a lower housing of the shift lever apparatus of FIG. 1.

Referring now to FIGS. 1 and 2, an embodiment of a shift lever apparatus according to the present invention is illustrated including a housing (not identified) which is installed to the surface of a floor of an automotive vehicle. The housing includes a lower housing 1 connected to the floor surface, and an upper housing 2 connected to the lower housing 1. A shift lever 3 is installed to the lower housing 1 in such a manner as to swingably move in a fore-and-aft direction of a body of the vehicle. The shift lever 3 is provided at its upper end with a knob, though not shown. The shift lever 3 is connected through a wire (not shown) with a transmission (not shown) of the vehicle, and adapted to change or shift change-speed ranges of the transmission by changing a swingable angle of the shift lever 3.

The lower housing 1 is formed with a swing space 1a within which the shift lever 3 is swingably movable. A pair of lower guide rail portions 1b are formed generally parallel with each other and located on upper parts at opposite sides of the swingable spaces.

Figure 3:
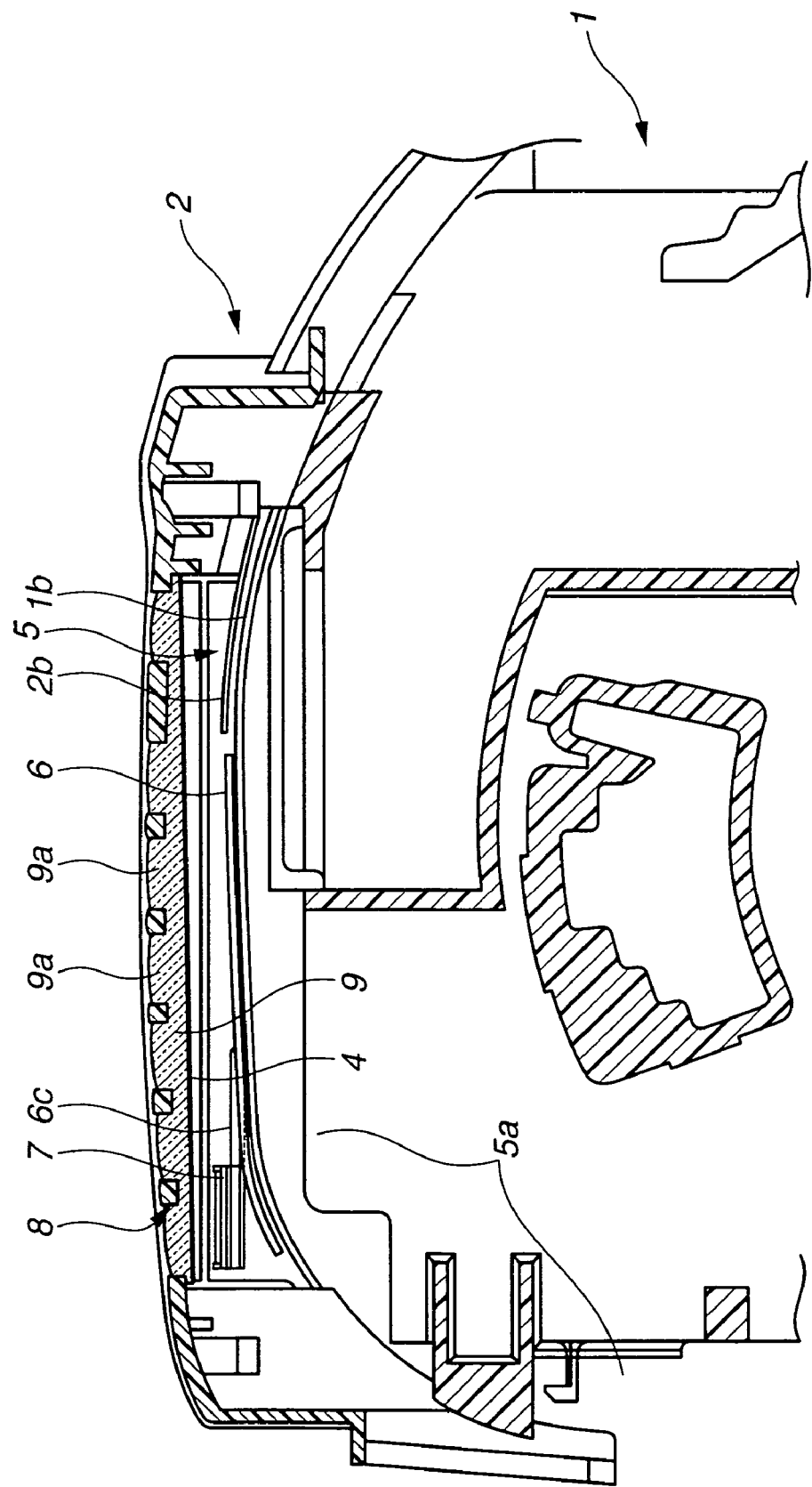
FIG. 3 is a vertical sectional view of an essential part of the shift lever apparatus of FIG. 1, showing a state where upper and lower housings are assembled.

The upper housing 2 is formed with a long opening 2a formed corresponding to the above-mentioned swing space 1a of the lower housing 1 so that the long hole 2a extends in a direction in which the shift lever is swingably movable. Seven fitting holes 8 for indicating the change-speed ranges of the transmission are formed aside and along the long opening 2a. As shown in FIG. 3, a transparent plate 9 formed of plastic or resin is disposed at an upper part of a space within the upper housing 2 and has a length generally equal to that of the long hole 2a. The transparent plate 9 is formed at its upper surface with projections 9a which are respectively locatable or fittable in the fitting holes 8. A thin indicator panel 4 is stuck on the lower surface of the transparent plate 9. Letters "L", "2", "3", "D", "N", "R", and "P" are indicated at the indicator panel 4 in the order mentioned in a direction of from the rear to front of the vehicle body and respectively located corresponding to the projections 9a of the transparent plate 9. As shown in FIGS. 1 and 8, the transparent plate is provided with frame portions or windows 4a (square in section) located aside the respective letters and at the side of the long hole 2a. The thus arranged transparent plate 9 with the indicator panel 4 is combined with the upper housing 2 in such a manner that the projections 9a are respectively fitted in the fitting holes 8. As shown in FIG. 8, the upper housing 2 is formed at its lower surface with a pair of guide rail portions 2b which are generally parallel with and spaced from each other in a direction perpendicular to the surface of the drawing including FIG. 8. In other words, each guide rail portion is plate-shaped and extends parallel with the surface of the drawing including FIG. 8 or extends along a plane (not shown) containing the axis of the shift lever 3 and extending in the fore-and-aft direction of the vehicle.

Figure 4:
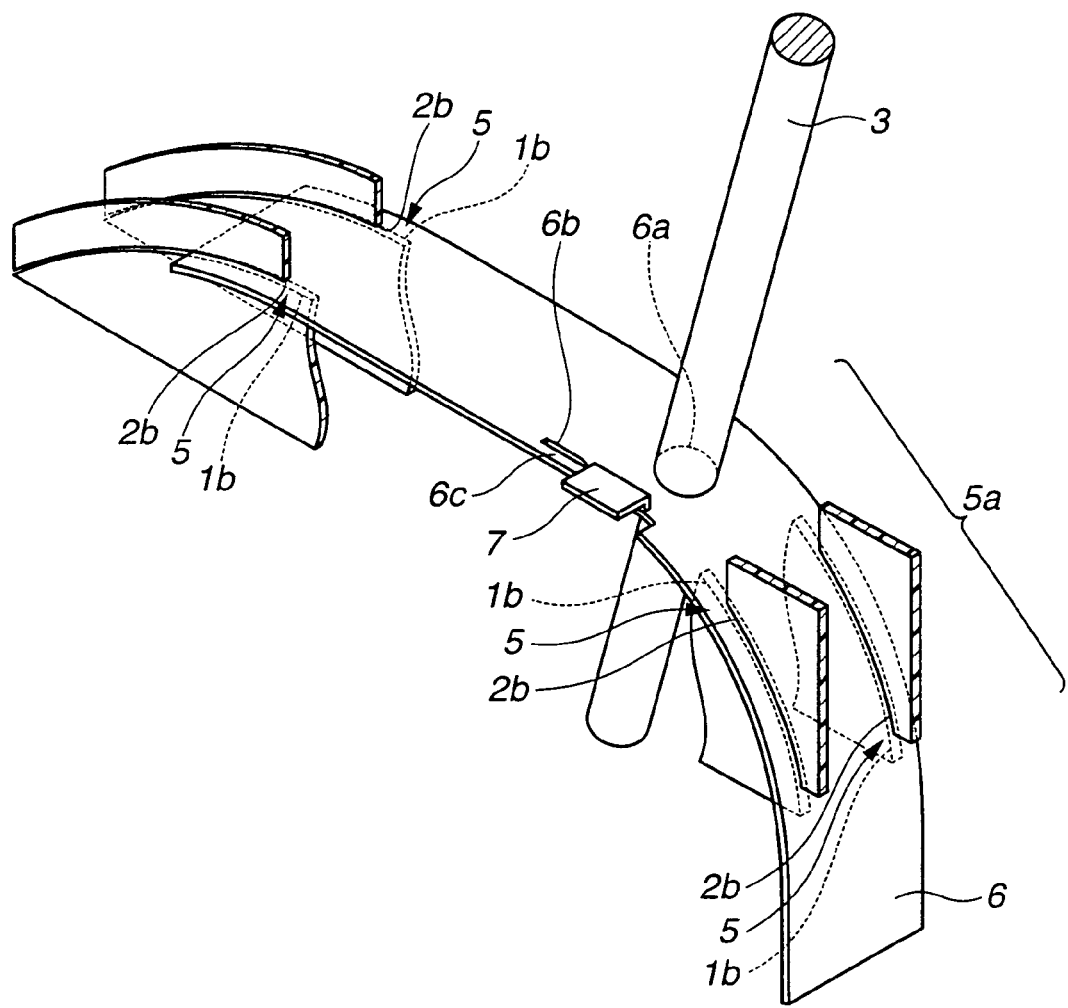
FIG. 4 is a fragmentary perspective view of an essential part of the shift lever apparatus of FIG. 1, showing a state where a slide cover is guided by a guide device.

When the upper housing 2 is combined with the lower housing 1 as shown in FIG. 3, a guide device or means 5 is constituted of the upper guide rail portions 2b and the lower guide rail portions 1b as shown in FIG. 4. Accordingly, the guide device 5 is formed with a pair of slits (no numerals) each of which extends between the upper and lower guide rail portions 2b, 1b. As seen from FIG. 3, the intermediate part of each slit of the guide device 5 extends generally horizontal; the front side (at the front side of the vehicle) of each slit of the same gently slopes down forward; and the rear side (at the rear side of the vehicle) of each slit sharply slopes down rearward along a smaller radius of curvature than that of the front side of each slit. Thus, a rear part (having the rear side of each slit) of the guide device serves as a descending guide section 5a by which the slide cover 6 is guided to separate downward from the indicator panel 4.

Figure 5A:
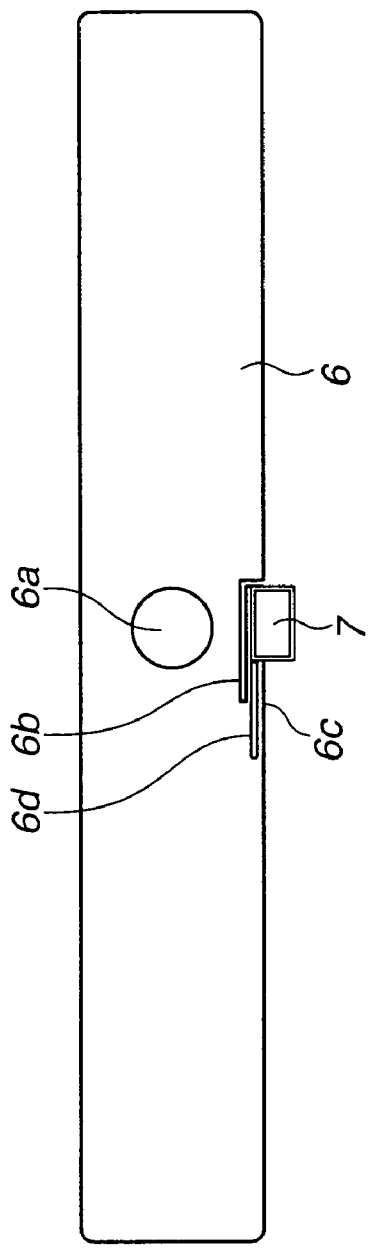
FIG. 5A is a plan view of the slide cover of FIG. 4, in a state of being straight or horizontal.
Figure 5B:
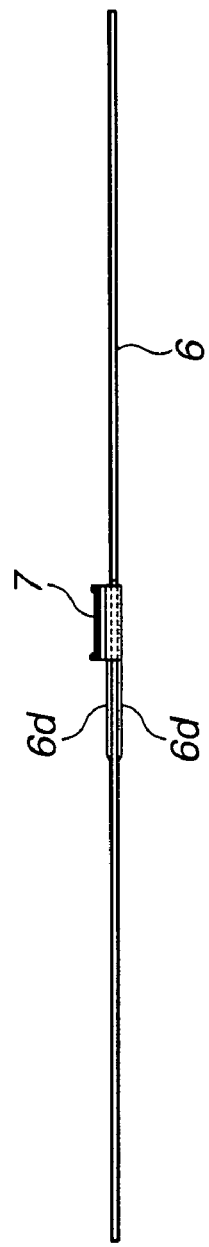
FIG. 5B is a side view of the slide cover of FIG. 5A.

A slide cover or member 6 is slidably disposed in the slits each of which is formed between the upper guide rail portion 2b and the lower guide rail portion 1b, so that the slide cover 6 is slidable along the slits of the guide device 5. The slide cover 6 is located to close the clearance between the lower housing 1 and the shift lever 3 so as to cover the swing space 1a. The detailed structure of the slide cover 6 is shown in FIGS. 5A and 5B in which the slide cover 6 is formed of plastic or resin and thin belt-shaped. The slide cover 6 is formed at its longitudinally and laterally central part with an opening 6a through which the shift lever 3 passes. Upon passing the shift lever 3 through the opening 6a, the slide cover 6 moves together with the shift lever 3 as a single unit while being guided by the guide device 5. More specifically, the slide cover 6 are located in and slidably moves along the slits each of which is between the upper guide rail portion 2b and the lower guide rail 1b.

Figure 5C:
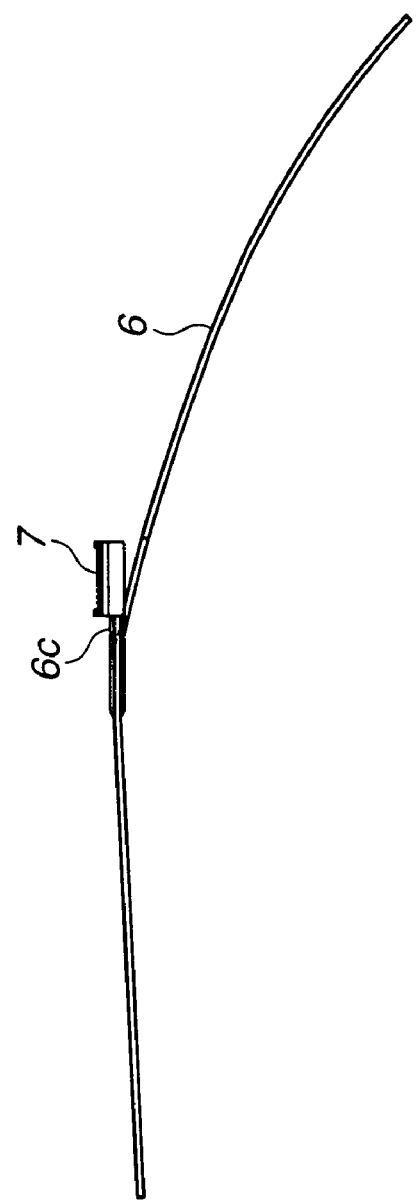
FIG. 5C is a side view of the slide cover of FIG. 5A, in a state of being bent upon being guided by the guide device.

The slide cover 6 is provided with a mark piece 7. As shown in FIG. 5A, the mark piece 7 is fixed to a straight elongate support portion or member 6c forming part of the slide cover 6. The support portion 6c is provided by forming a L-shaped (in section) slit in the slide cover at the side of the indicator panel 4. More specifically, the L-shaped slit includes a short slit portion (no numeral) and a long slit portion (no numeral). The short slit portion is formed perpendicular and opens to a side edge of the slide cover 6 which side edge is at the side of the indicator panel 4. The long slit portion is formed parallel with the side edge of the slide cover 6 which side edge is at the side of the indicator panel 4. The long slit portion has a first end connected to the short slit portion, and a second end which is opposite to the first end and closed. Accordingly, the support portion 6c cannot follow deformation of the major part of the slide cover 6 as shown in FIG. 5C.

Thus, the support portion 6c is formed extending in a direction of from the front to rear of the vehicle and has a tip end section having a tip end defined by the short slit portion of the L-shaped slit 6b. The mark piece 7 is formed integral with the tip end section of the support portion 6c and projected laterally from the side edge of the slide cover. A red seal (no numeral) is stuck on the upper surface of the mark piece 7 so as to stand out clearly. In order to increase the strength of the support portion 6c against bending, elongate projections or ribs 6d, 6d for the reinforcement purpose are formed at the upper and lower surfaces of the support portion 6c as shown in FIGS. 5A, 5B and 5C. Each elongate projection 6d extends in the longitudinal direction of the support portion 6c. It will be understood that the mark piece 7 is locatable at any of the frame portions 4a formed respectively aside the letters representing respective change-speed ranges, of the indicator panel 4 so that a driver can visibly recognize the present change-speed range of the transmission.

Figure 7:
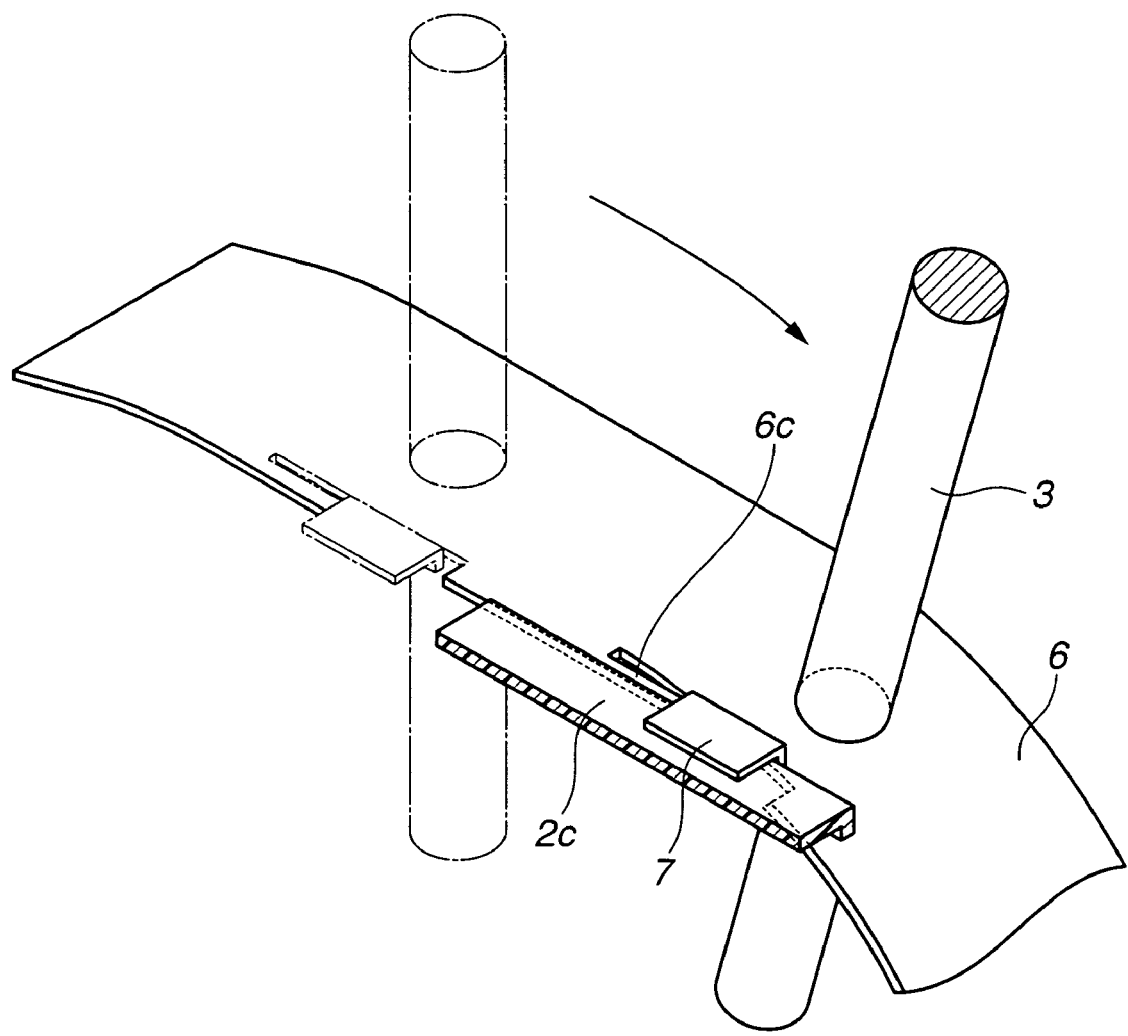
FIG. 7 is a fragmentary enlarged perspective view of an essential part of the shift lever apparatus of FIG. 1, illustrating an operational manner of a mark piece in the shift lever apparatus according to the present invention.

In order to move the mark piece 7 in a state of being securely approached to the indicator panel 4, the upper housing 2 is integrally provided with a horizontal guide plate or member 2c as shown in FIG. 7. The guide plate 2c is located immediately below the indicator panel 4 and has a length generally equal to that of the indicator panel 4. The guide plate 2c is generally parallel with the indicator panel 4. The mark piece 7 is located between the guide plate 2c and the indicator panel 4 and movable in the fore-and-aft direction of the vehicle body.

Next, operation of the shift lever apparatus will be discussed. In FIG. 1, the shift lever 3 is swung forward or rearward upon the driver pushing a push button (not shown) located at the upper end section of the shift lever 3 while grasping a knob (not shown) of the shift lever 3. At this time, the slide cover 6 slidably moves forward or rearward together with the shift lever 3 along the slits of the guide device 5. Simultaneously, the red mark piece 7 moves upon sliding contact with the upper surface of the horizontal guide plate 2c, so that the mark piece 7 is brought into any one of the frame portions 4a which respectively correspond to the letters "L", "2", "3", "D", "N", "R", and "P". The letter located aside the frame portion 4a with the mark piece 7 represents the present change-speed range of the transmission.

Figure 6A:
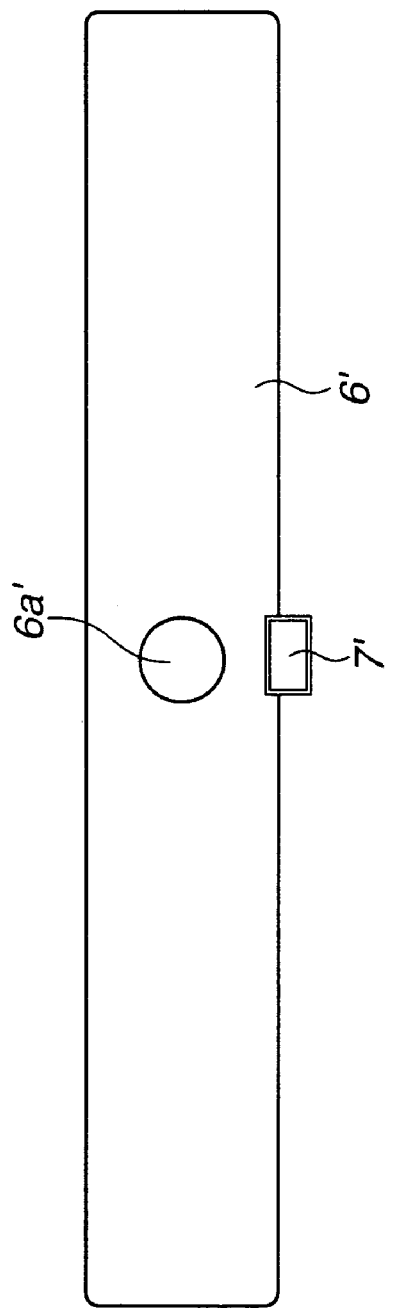
FIG. 6A is a side view similar to FIG. 5A but showing an earlier technology slide cover of a shift lever apparatus, in a state of being straight or horizontal.
Figure 6B:
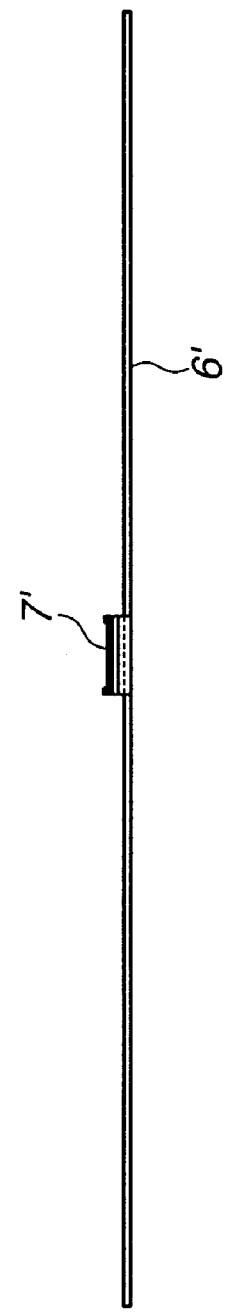
FIG. 6B is a side view similar to FIG. 5B but showing the slide cover of FIG. 6A.
Figure 6C:
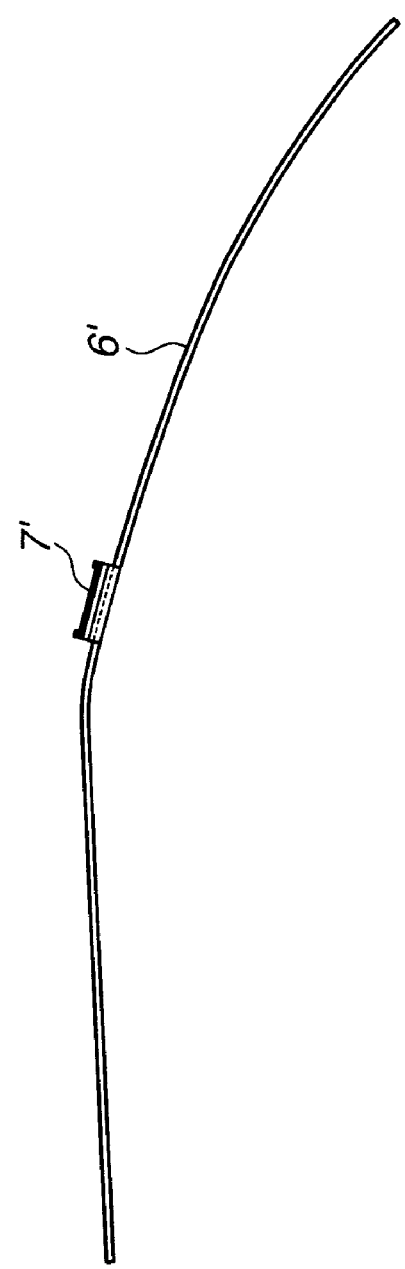
FIG. 6C is a side view similar to FIG. 5C but showing the side cover of FIG. 6B, in a state of being bent upon being guided by a guide device.

As shown in FIG. 3, the intermediate part of each slit of the guide device 5 extends generally horizontal; the front side of each slit of the same gently slopes down forward; and the rear side of each slit sharply slopes down rearward along the smaller radius of curvature than that of the front side of the slit. Here, assume that a shift lever apparatus similar to that of the present invention includes an earlier technology slide cover 6' as shown in FIGS. 6A to 6C used in place of the slide cover 6 of the present invention. In this shift lever apparatus, a red mark piece 7' is also rigidly connected to the slide cover 6'. Therefore, when the slide cover 6' is moved rearward together with the mark piece 7', the mark piece 7' moves sharply downward following the slide cover 6' as shown in FIG. 6C, so that the mark piece 7' becomes downward far from the indicator panel 4. As a result, the driver is difficult to see the red mark piece 7'. In contrast, according to this embodiment according to the present invention, the mark piece 7 is fixed to the support portion 6c which is provided by forming the L-shaped slit 6b in the slide cover 6. Therefore, even when the slide cover 6 moves to the descending guide section 5a of the guide device 5 at the side of the rear of the vehicle body and sharply descends so that the mark piece 7 becomes separate from the indicator panel 4, variation in distance between each slit of the guide device 5 and the horizontal guide plate 2c can be absorbed thereby making it possible to move horizontally along the horizontal guide plate 2c, as shown in FIGS. 5A to 5C and FIG. 7. As a result, the mark piece 7 can move keeping close to the indicator panel 4. Thus, the mark piece 7 can be prevented from becoming downwardly separate from the indicator panel 4, thereby avoiding degradation of visibility of the mark piece 7.

While the guide plate or member 2c has been shown and described as allowing the mark piece to move keeping close to the indicator panel in the embodiment, it will be understood that it is also possible to allow the mark piece to move keeping close to the indicator panel without using the guide plate 2c as discussed below. That is, even when the slide cover 6 is deformed as shown in FIG. 5C, the mark piece 7 can keep the same height as the horizontal part (the left side part in FIG. 5C) of the slide cover 6. In other words, the mark piece 7 is in a state of being generally horizontally supported through the support portion 6c by the horizontal part (of the slide cover 6) which is located in front of the descending guide section 5a of the guide device 5. Thus, even though the horizontal guide plate 2c is not provided, it is possible that the mark piece 7 horizontally moves while keeping close to the indicator panel 4.

Additionally, although the support portion 6c for the mark piece 7 has been shown and described as being provided by forming the L-shaped slit 6b in the embodiment, it will be appreciated that the support portion 6c may be replaced with an independent support member which is fixed to the side edge of the slide cover in such a manner as to extend in a direction toward the rear of the vehicle body, in which the mark piece is provided to the support member.

Further, while the embodiment has been shown and described as being arranged such that the descending guide section 5a of the guide device 5 is located at the side of rear of the vehicle body, it will be understood that the descending guide section may be located at the side of front of the vehicle body, in which the support portion 6c for the mark piece 7 extends in a direction toward the front of the vehicle body. Furthermore, although the slide cover 6 has been shown and described as functioning as a cover in the embodiment, the slide cover 6 may be replaced with other slide members which do not have a function as a cover and can merely moved together with the shift lever 3. Moreover, the indicator panel 4 may not be substantially horizontal and therefore may be slightly projected upwardly, for example, to be arcuate.

As appreciated from the above, according to the present invention, the slide member slidingly moves together with the shift lever upon being guided by the guide device. When the slide member slidingly moves to reach the descending guide section of the guide device, the slide member moves downward separating from the indicator panel while the mark piece moves keeping close to the indicator panel thereby maintaining the generally same height as that at a time before the slide member reaches the descending guide section. Because, the mark piece is supported by the support member which does not follow the deformation of the slide member. As a result, the mark piece can be effectively prevented from separating downward from the indicator panel, thereby avoiding degradation in visibility of the indicator panel.

The entire contents of Japanese Patent Application No. 2003-428848, filed Dec. 25, 2003, are incorporated herein by reference.

Although the invention has been described above by reference to certain embodiments of the invention, it will be understood that the invention is not limited to the embodiments described above. Modifications and variations of the embodiments described above will occur to those skilled in the art, in light of the above teachings. The scope of the invention is defined with reference to the following claims.

What is claimed is:

1. A shift lever apparatus for a vehicle, comprising:
a shift lever which is swingable in a fore-and-aft direction of a vehicle body of the vehicle to change change-speed ranges of a transmission of the vehicle;
an indicator panel indicating positions which respectively correspond to the change-speed ranges, the positions being aligned in the fore-and-aft direction of the vehicle body;
a slide member which is band-shaped and movable in relation to the shift lever;

a guide device disposed extending in the fore-and-aft direction of the vehicle body to slidably guide the slide member, the guide device including a descending guide section which allows the slide member to be guided to move downward relative to the indicator panel, the descending guide section being located at one of first and second sides of the guide device, the first and second sides being opposite in the fore-and-aft direction of the vehicle body;

a mark piece adapted to indicate one of the positions of the indicator panel to represent a present change-speed range of the transmission; and a support member connected to the slide member, the support member having an end portion which is fixedly connected to a side edge of the slide member, a major part of the support member being separate from the slide member and free from following a deformation of the slide member, the mark piece being fixedly connected to the major part of the support member, such that the mark piece moves while keeping close to the indicator panel along with sliding movement of the slide member.

2. A shift lever apparatus as claimed in claim 1, wherein the support member is maintained straight even when a part of the slide member adjacent to the support member is bent upon being guided by the descending guide section of the guide device.

3. A shift lever apparatus as claimed in claim 1, wherein the slide member has a section defining a slit, a portion of the slide member adjacent to the slit serving as the support member.

4. A shift lever apparatus as claimed in claim 3, wherein the slit is generally L-shaped in plan view, wherein the slide member includes a section defining a short slit portion open to an edge of the slide member, and a section defining a long slit portion connected to the short slit portion, the generally L-shaped slit leaving the portion of a generally cantilever shape.

5. A shift lever apparatus as claimed in claim 1, further comprising a guide member for allowing the mark piece to be guided along the indicator panel.

6. A shift lever apparatus as claimed in claim 5, wherein the guide member is fixedly disposed substantially parallel with the indicator panel, and wherein the mark piece is movably interposed between the guide member and the indicator panel.

7. A shift lever apparatus as claimed in claim 1, wherein the support member is generally plate-shaped and has first and second opposite surfaces, wherein a reinforcement projection is formed at at least one of the first and second surfaces of the support member, the reinforcement projection continuously extending in a longitudinal direction of the support member.

8. A shift lever apparatus as claimed in claim 1, wherein the mark piece is formed integral with the support member.

9. A shift lever apparatus as claimed in claim 1, wherein the indicator panel has letters which respectively indicate the positions corresponding respectively to the change-speed ranges of the transmission.

10. A shift lever apparatus as claimed in claim 1, wherein the slide member is belt-shaped, wherein the guide device is formed with a slit through which the slide member slidably moves.

11. A shift lever apparatus as claimed in claim 1, wherein the support member is capable of being flush with the slide member.

12. A shift lever apparatus as claimed in claim 1, wherein the mark piece is fixedly connected to the major part of the support member such that the mark piece moves while keeping close to the indicator panel along with the sliding movement of the slide member such that the mark piece maintains generally a same distance from the indicator panel in the descending guide section as that at a time before the slide member reaches the descending guide section.

13. A shift lever apparatus as claimed in claim 1, wherein the mark piece is fixedly connected to the major part of the support member such that the mark piece moves while keeping close to the indicator panel along with the sliding movement of the slide member in the descending guide section such that the mark piece is effectively prevented from moving downward relative to the indicator panel in the descending guide section.

14. A shift lever apparatus for a vehicle, comprising:
a shift lever which is swingable in a fore-and-aft direction of a vehicle body of the vehicle to change change-speed ranges of a transmission of the vehicle;

an indicator panel indicating positions which respectively correspond to the change-speed ranges, the positions being aligned in the fore-and-aft direction of the vehicle body;

a slide member which is band-shaped and movable in relation to the shift lever;

a guide device disposed extending in the fore-and-aft direction of the vehicle body to slidably guide the slide member, the guide device including a descending guide section which allows the slide member to be guided to move downward relative to the indicator panel, the descending guide section being located at one of first and second sides of the guide device, the first and second sides being opposite in the fore-and-aft direction of the vehicle body; and a mark piece adapted to indicate one of the positions of the indicator panel to represent a present change-speed range of the transmission, wherein the slide member includes a section defining a slit to leave a support portion which is integral at its one end with a major part of the slide member, the support portion being free from following a deformation of the slide member, the mark piece being fixedly connected to the support portion such that the mark piece moves while keeping close to the indicator panel along with sliding movement of the slide member.

15. A shift lever apparatus as claimed in claim 14, wherein the slit is generally L-shaped in plan view, the slit defining section including a portion defining a short slit portion open to a side edge of the slide member, and a portion defining a long slit portion connected to the short slit portion and extending parallel with the side edge of the slide member.

16. A shift lever apparatus as claimed in claim 14, wherein the mark piece is fixedly connected to the support portion such that the mark piece moves while keeping close to the indicator panel along with the sliding movement of the slide member such that the mark piece maintains generally a same distance from the indicator panel as that at a time before the slide member reaches the descending guide section.

17. A shift lever apparatus as claimed in claim 14, wherein the mark piece is fixedly connected to the support portion such that the mark piece moves while keeping close to the indicator panel along with the sliding movement of the slide member in the descending guide section such that the mark piece is effectively prevented from moving downward relative to the indicator panel in the descending guide section.

* * * * *

UNITED STATES PATENT AND TRADEMARK OFFICE
CERTIFICATE OF CORRECTION

PATENT NO. : 7,484,433 B2  Page 1 of 1
APPLICATION NO. : 11/017193
DATED : February 3, 2009
INVENTOR(S) : Tetuya Arakawa et al.

It is certified that error appears in the above-identified patent and that said Letters Patent is hereby corrected as shown below:

Title Page;

The 2nd Assignee name should read as:

(73)   Mitsubishi Jidosha Kogyo Kabushiki Kaisha

Signed and Sealed this

Twenty-sixth Day of May, 2009

JOHN DOLL
*Acting Director of the United States Patent and Trademark Office*

UNITED STATES PATENT AND TRADEMARK OFFICE
CERTIFICATE OF CORRECTION

PATENT NO.      : 7,484,433 B2                                                              Page 1 of 1
APPLICATION NO. : 11/017193
DATED           : February 3, 2009
INVENTOR(S)     : Arakawa et al.

It is certified that error appears in the above-identified patent and that said Letters Patent is hereby corrected as shown below:

On the Title page,

[*] Notice:    Subject to any disclaimer, the term of this patent is extended or adjusted under 35 USC 154(b) by 725 days Delete the phrase "by 725 days" and insert -- by 1046 days --

Signed and Sealed this

Third Day of August, 2010

David J. Kappos
*Director of the United States Patent and Trademark Office*